United States Patent [19]

Westerink et al.

[11] Patent Number: 5,420,971
[45] Date of Patent: May 30, 1995

[54] IMAGE EDGE FINDER WHICH OPERATES OVER MULTIPLE PICTURE ELEMENT RANGES

[75] Inventors: Peter Westerink, Mount Laurel, N.J.; Daniel Gnanaprakasam, Secane, Pa.; Patrick Devaney, Freehold, N.J.; Robert Topper, Hatboro, Pa.

[73] Assignee: Panasonic Technologies, Inc., Princeton, N.J.

[21] Appl. No.: 213,127

[22] Filed: Mar. 15, 1994

Related U.S. Application Data

[63] Continuation-in-part of Ser. No. 178,948, Jan. 7, 1994.

[51] Int. Cl.⁶ .................................... G06T 9/20
[52] U.S. Cl. .................................... 395/133; 395/143; 382/181
[58] Field of Search ............... 395/126–132, 395/133, 134, 141, 143, 155, 161; 382/6, 8, 41, 47, 16, 22; 356/73.1

[56] References Cited

U.S. PATENT DOCUMENTS

| | | | |
|---|---|---|---|
| 4,399,554 | 8/1983 | Perkins, III et al. | 382/8 |
| 5,054,100 | 10/1991 | Tai | 382/47 |
| 5,063,604 | 11/1991 | Weiman | 382/41 |
| 5,179,419 | 1/1993 | Palmquist et al. | 356/73.1 |
| 5,268,967 | 12/1993 | Jang et al. | 382/6 |

OTHER PUBLICATIONS

Toru Kaneko, "Hierarchical Coding of Line-Drawing Data Described by the Chain-Code Sequence", *Systems and Computers in Japan*, vol. 18, No. 4, pp. 53–62 (1987).

L. Vincent and P. Soille, "Watersheds in Digital Spaces: An Efficient Algorithm Based on Immersion Simulations", *IEEE Transactions on Pattern Analysis and Machine Intelligence*, vol. 13, No. 6, pp. 583–598 (Jun. 1991).

A. Montanvert, et al., "Hierarchical Image Analysis Using Irregular Tessellations", *IEEE Transactions on Pattern Analysis and Machine Intelligence*, vol. 13, No. 4, pp. 307–316 (Apr. 1991).

T. Westman, et al., "Color Segmentation by Hierarchical Connected Components Analysis with Image Enhancement by Symmetric Neighborhood Filters", *IEEE*, pp. 796–802 (1990).

T. Vlachos and A. G. Constantinides, "Graph–Theoretical Approach to Colour Picture Segmentation and Contour Classification", *IEEE Proceedings-I*, vol. 140, No. 1, pp. 36–45 (Feb. 1993).

R. Sedgewick, "Algorithms", Addison-Wesley Publishing Company, pp. 393–398.

P. S. Heckbert, "A Seed Fill Algorithm", pp. 275–277.

*Primary Examiner*—Almis R. Jankus
*Attorney, Agent, or Firm*—Ratner & Prestia

[57] ABSTRACT

An edge finder for an image processing system locates edges in a digitized image over several different ranges of pixel values and assigns, to each pixel value an edge characteristic value which represents a minimum edge value for the pixel in the image. The exemplary edge finder that is able to resolve transitions occurring between two pixels or over groups of four or eight pixels to determine whether an edge should be defined between the original two pixels. The edge finder simultaneously examines four edges in two dimensions to determine the edgeness value for each pixel in the digitized image.

7 Claims, 4 Drawing Sheets

IMAGE EDGE FINDER WHICH OPERATES OVER MULTIPLE PICTURE ELEMENT RANGES

This application is a continuation in part of U.S. patent application Ser. No. 08/178,948 entitled SEGMENTATION BASED IMAGE COMPRESSION SYSTEM filed Jan. 7, 1994.

FIELD OF THE INVENTION

The present invention is directed to an edge finder for an image processing system and, in particular, to such an edge finder which locates edges associated with a target picture element (pixels) by examining multiple groups of pixels surrounding the target pixel.

BACKGROUND OF THE INVENTION

The location of edges in an image is fundamental to several types of image processing. In pattern recognition, image edges define boundaries between image segments. Either these image segments or the defined boundaries are correlated with reference images in order to recognize objects in the image. Thus, the location of edges in an image is an important factor in pattern recognition.

Edges are also important for systems attempting to model human vision. The human eye is sensitive to edges and perceives a low-resolution image having hard edges as being more subjectively pleasing than an image of similar resolution which has soft edges. Thus, much of the information value of an image is in its edges.

Furthermore, image edges are important for image compression systems. Relatively efficient intra-frame video encoding systems exist which are based on linear transforms, the JPEG compression system, for example, is based on discrete cosine transforms. Linear transforms have difficulty compressing sharp edges. Consequently, these edges tend to blur and soften through multiple compression and decompression operations. Thus, systems based on linear transforms are not well suited for multi-generational compression and decompression. An image compression system which maintains edges in the image can produce an encoded image which is more subjectively pleasing through several compression/decompression cycles. An edge finder would be beneficial in any compression system which maintains edges Many edge finders currently in use locate edges by calculating gradients of pixel values, vertically, horizontally, or both, in the image. It is well recognized, however, that edges are discontinuities in the image where the measurement of gradients can be ill-defined. This behavior of gradient-based edge finders is sensitive to noise. Another type of edge finder operates by identifying and growing regions in the image. At the end of the region growing process, the boundaries of the regions correspond to edges in the original image. For this type of edge finder, a starting point may be to find locations in the image where edges do not exist.

SUMMARY OF THE INVENTION

The present invention is embodied in an edge finder for an image processing system. The edge finder locates edges in a digitized image to produce a representation of the picture in which each pixel is encoded with the quality of its edges, that is to say, each pixel is encoded with a value indicating the degree to which it forms an edge in the image; this property is referred to as the "edgeness" of the pixel. The edge finder includes circuitry which defines several edgeness values for a particular edge of a pixel by comparing pixels in respectively different ranges surrounding the edge. It then selects one edgeness value from among the several edgeness values as representing the edge.

DETAILED DESCRIPTION

Overview

In many image processing applications, decisions regarding an edge are made based on the "strength" of the edge. In the exemplary embodiment of the invention each pixel in the image is described by multiple links to respective pixels which are adjacent to the pixel in the image. These link values indicate the strength of each of four respective edges that may be defined for the pixel relative to a predetermined threshold. To simplify the description, this edge strength value is referred to as "edgeness". In general, a large edgeness value represents a more significant edge in the image while a small edgeness value represents an insignificant edge.

It is a feature of this invention that, in geometrical terms, the edge is located between the two pixels rather than being co-located with either pixel. Each pixel has another value in addition to its link values. In the exemplary embodiment, this is a minimum edgeness value. This minimum edgeness value may be used, for example, as the starting point for a region-growing type of edge finder. It is contemplated, however, that this additional value may be the maximum edgeness value for the pixel or some other function, for example, the mean or median edgeness value for the pixel. The type of edgeness information stored for each pixel would depend on the particular application in which the edge finder is used.

The present invention produces a data structure, an edgeness map, which is separate from the image and contains twice the number of data values as the image. Each pixel value has four links to adjacent pixel values. Each link is shared by two pixels, thus the number of links is twice the number of pixels. The edgeness value between two pixels is calculated using a multi-scale edge strength operator which locates both soft edges, i.e., edges having a width between 4 and 8 pixels, and hard edges, edges which clearly occur between 2 pixel positions. In the exemplary embodiment of the invention, the edge information is stored with the pixel information. Accordingly, for each pixel value, a 12-bit edge information value is generated. This value includes an eight-bit edgeness value and four link bits.

Figure 2A:
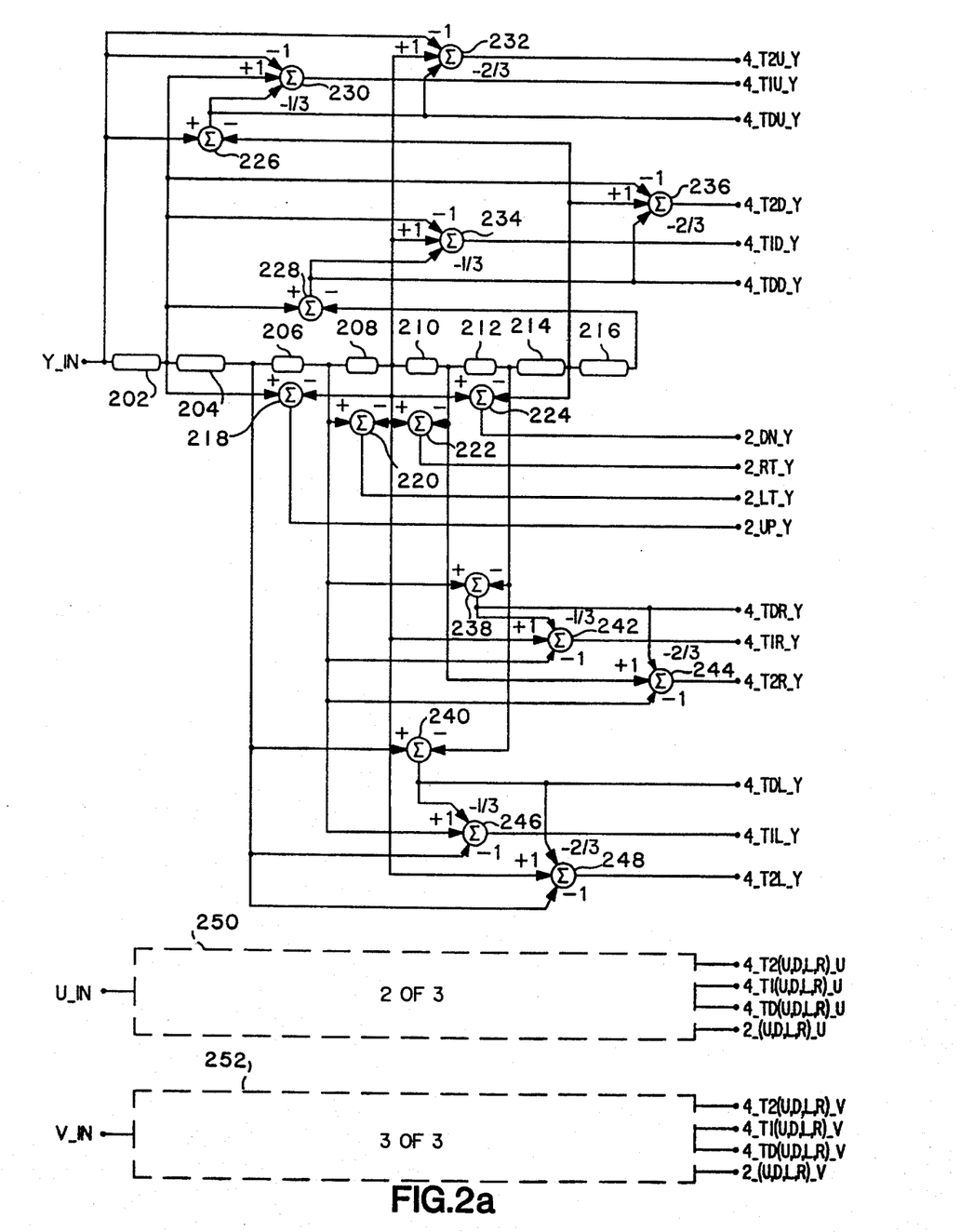
FIGS. 2a and 2b are logic schematic diagrams, partly in block diagram form, of an edge finder in accordance with the present invention.
Figure 2B:
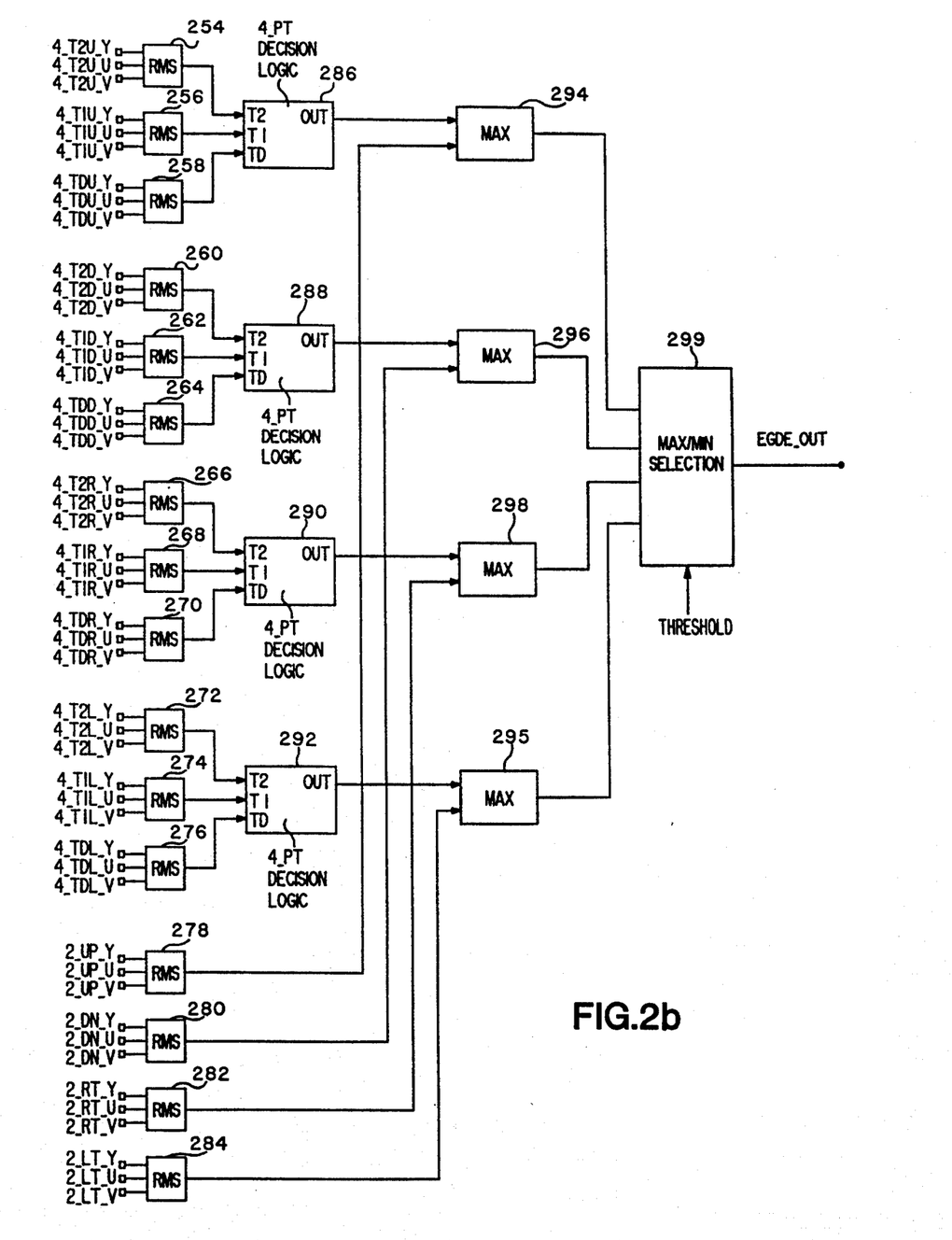

The operation of the edge finder is described in an overview section, which summarizes the operation of the circuitry, and then in detail with reference to the FIGS. 2a and 2b.

In the exemplary embodiment of the invention, the edge finder assigns, to each image pixel, a minimum link value which holds the value of the smallest difference between the pixel value and each of its four neighboring pixel values (right, left, up and down).

This edge value is determined for each of the four edges by examining the link between the pixel and its adjacent pixel in three ranges: 1) considering only the two pixels that form the edge, 2) considering the edge as being defined by four pixels, two on either side of the edge, and 3) considering the edge as being defined by eight pixels, four on either side of the edge.

The edge finder also assigns four one-bit link flags to each pixel. These link flags indicate which of the links has a value that is either less than a threshold value or equal to the smallest link value for the pixel if any of the link values are greater than the threshold value.

If the edge finder 414 determines that an edge does not exist between two adjacent pixel positions using the four- or eight-pixel windows, it assigns a value of zero for the edge value produced using the respective window. The two-pixel window of the edge finder always produces a value representing the numerical difference between adjacent pixel values.

If, using the four- or eight-pixel windows, the edge finder determines that a soft edge does exist between the two adjacent pixels, then the edge finder assigns the largest edge value from among those determined by the two-, four- and eight-pixel windows for the particular link of the pixel. As a final step, the edge finder assigns a value equal to one plus the smallest of the four links as the minimum link value for the pixel.

If, however, all of the links of the pixel are less than a preset threshold, the edge finder sets the minimum link value to zero. The edge finder provides, as its output values, this minimum link value and a four-bit value which indicates whether the pixel has links which are less than the threshold. These four-bits are the link-bits for the pixel. The link-bit is set for each link which has an edgeness value that is less than the threshold.

In the exemplary embodiment of the invention, each image pixel is defined as having four links to adjacent pixels to the left, right, above and below the image pixel. Each of these links may define a one dimensional edge between the pixel and the corresponding adjacent pixel. Thus, the description of the edge finder algorithm can be in terms of a one dimensional sequence of values without any loss of generality.

As described above in the exemplary embodiment of the invention, an edge is defined as existing between two pixel positions. Because the edges are defined in this way, the present invention can easily handle images having relatively fine features, for example, lines having a width of only 1 pixel. Since the edge finder uses a multi-scale implementation, it performs well on both sharp and diffuse boundaries in the image.

Measuring edges in a noise free image having very crisp edges, such as an animated frame, is a trivial problem. Edges in this type of image may be located using a simple pixel-by-pixel difference calculator. This calculator will produce relatively large edge values at the sharp region transitions.

In most natural pictures, however, many of the edges are not very sharp. Thus, it often takes several pixel positions to transfer from one more or less homogeneous region to another. These soft edges may be the result of motion blur, out of focus blur of background objects, or gradual changes in illumination or reflection. Consequently, an edge measurement technique that considers gray value or color difference values only between pairs of neighboring pixels is not sufficient to identify edges in most natural images.

The exemplary edge finder addresses this problem by determining edges in 2 pixel, 4 pixel and 8 pixel windows surrounding the target pixel. The edge value that is assigned to the particular link being measured is the largest edge value found using the 2-pixel, 4-pixel and 8-pixel windows.

In the case of color pixels, each pixel can be represented by a vector that includes, for example, 3 components, a luminance component, Y, and two color difference components, U and V. Thus, a pixel, $X_i$, at position i is represented by equation (1).

$$x_i = \begin{bmatrix} y_i \\ u_i \\ v_i \end{bmatrix} \quad (1)$$

The color edge height, $H_i$ between pixel $x_i$ and pixel $x_{i+1}$ is defined by equation (2)

$$H_i = \sqrt{(y_{i+1} - y_i)^2 + (u_{i+1} - u_i)^2 + (v_{i+1} - v_i)^2} \quad (2)$$

It is this edge height value, $H_i$, of the two pixel window which is compared with corresponding edge height values for four- and eight- pixel windows centered about the target edge, to determine the value of the edge between pixels $x_i$ and $x_{i+1}$.

In order to determine whether an edge exists in a group of four pixels the present invention normalizes the pixel data in the four-pixel window with respect to absolute level and range to produce two parameters having only two degrees of freedom. To simplify the description, the algorithm is described below in terms of scalar pixel values, that is to say, having only a luminance component. The algorithm is then extended to pixel vectors.

Given four sequential data points $X_0$, $X_1$, $X_2$ and $X_3$, the absolute gray level of the pixels is removed by subtracting $X_0$ from each of the pixel values $X_1$, $X_2$ and $X_3$. In addition, the range of the pixel values is normalized as shown in the equations (3) which define the two parameters, $t_1$ and $t_2$.

$$t_1 = (x_1 - x_0)/(x_3 - x_0)$$
$$t_1 = (x_2 - x_0)/(x_3 - x_0) \quad (3)$$

As shown in the equations (3), two free parameters, $t_1$ and $t_2$, can fully describe the shape of a one-dimensional image transition in four-pixel window.

If we assume that a perfect linear edge would be represented by values 0, ⅓, ⅔ and 1, we can change the parameters $t_1$ and $t_2$ to represent deviations from the ideal edge, as shown in the equations (4).

$$t_1 = (x_1 - x_0)/(x_3 - x_0) - \tfrac{1}{3}$$
$$t_2 = (x_2 - x_0)/(x_3 - x_0) - \tfrac{2}{3} \quad (4)$$

If the sign of the parameter $t_2$ is changed, the equations (4) may be rewritten as the equations (5).

$$t_1 = (x_1 - x_0)/(x_3 - x_0) - \tfrac{1}{3}$$

$$t_2 = (x_3 - x_2)/(x_3 - x_0) - \tfrac{1}{3} \tag{5}$$

The two parameters, $t_1$ and $t_2$, defined by the equations (5) are symmetrical with respect to each other. Consequently, if the order of the data sequence $x_0$, $x_1$, $x_2$ and $x_3$ is reversed, the two variables $t_1$ and $t_2$ will be reversed. For this reason, and because the equations (5) can readily be extended to color pixels, the inventors have chosen the equations (5) for edge representation.

Figure 1A:
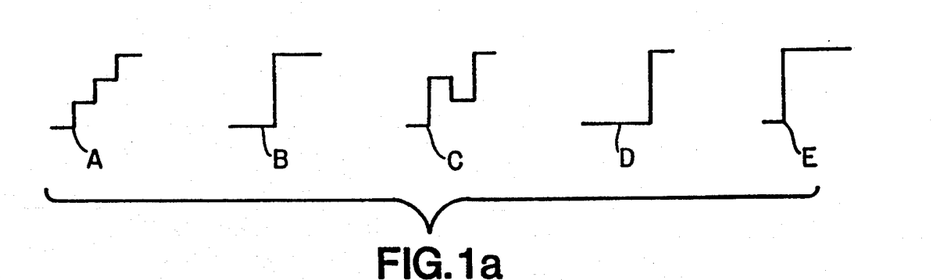
FIGS. 1a and 1b are graphical depictions of edge properties which are useful for describing the operation of an edge finder according to the present invention.

In order to determine if an edge is centered in a four-pixel window, the relative values of the four pixels in the window are desirably classified as to whether they represent an edge or do not represent an edge. Some of the possible data configurations which may be considered for edge classification are shown in FIG. 1a. In this figure, the configuration A represents a soft edge (i.e. linear ramp). Configuration B represents a hard edge, configuration C represents a questionable soft edge and configurations D and E represent shifted hard edges. Ideally, the multi-scale edge finder should recognize configurations A and B as having an edge exactly in the center of the window. The hard edge in configuration B will be recognized by the two-pixel window edge finder, whereas the soft edge A will desirably be recognized by the four-pixel window edge finder. Configuration C is questionable and, so, may be interpreted as not defining an edge centered in the four-pixel window. Finally, neither configuration D nor configuration E should be recognized as a centered edge using the four-pixel window.

Figure 1B:
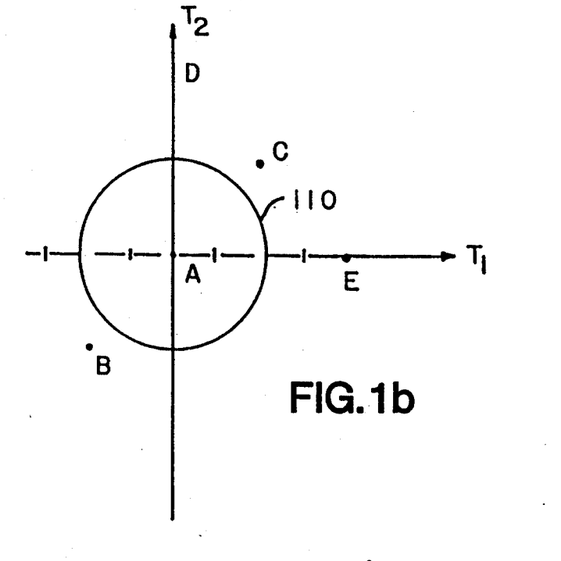

Using the equations (5) to define the edge features, a specific area may be defined in the two dimensional space spanned by $(t_1, t_2)$. Ordered pairs of the values $t_1$ and $t_2$ which fall within this area are considered to define an edge recognized by the four-pixel window while ordered pairs which fall outside of the area are considered not to define an edge. An area of this type is defined as shown in FIG. 1b. The circular area of radius R, shown in FIG. 1b is defined by equation (6).

$$R \geq \sqrt{t_1^2 + t_2^2} \tag{6}$$

The edge definition area shown in FIG. 1b is used in the exemplary embodiment of the invention. It is contemplated, however, that the shape of the region may be changed to fit other validation criteria for a four-pixel window edge. Changing or refining the region shape can thus be considered a fine tuning process for the edge finder algorithm.

Pairs of edge defining values which fall outside of the edge definition area are assigned a height value, H, of zero. If the values for a four-pixel sequence fall within the edge defining area, they are assigned an edge height value, H, defined by equation (7).

$$H = |x_3 - x_0| \tag{7}$$

The edge height value for the four-pixel window is defined as an absolute value since, for use in segmentation, the direction of an edge—either up or down—is irrelevant.

The analysis set forth above has considered pixel values as being scalars, for example, as may be found in a monochrome image. If the edge definition algorithm is extended to pixel vectors, as described above for a color image, the edge defining values $t_1$ and $t_2$ are defined by the equations (8) and (9).

$$t_1 = \| x_1 - (x_0 + (\tfrac{1}{3})(x_3 - x_0)) \| / \| (x_3 - x_0) \|$$

$$t_2 = \| x_2 - (x_0 + (\tfrac{2}{3})(x_3 - x_0)) \| / \| (x_3 - x_0) \| \tag{8}$$

or, equivalently $$t_1 = \| 2x_0 - 3x_1 + x_3 \| / \| 3(x_3 - x_0) \|$$

$$t_2 = \| x_0 - 3x_2 + 2x_3 \| / \| 3(x_3 - x_0) \| \tag{8}$$

and the height of the edge is defined by the length of the difference vector $x_3 - x_0$, which may be written in its vector components as shown in equation (10).

$$H = \sqrt{(y_3 - y_0)^2 + (u_3 - u_0)^2 + (v_3 - v_0)^2} \tag{10}$$

The edge finder algorithm may also be extended to an eight-pixel window. In this instance, the test for whether a set of eight-pixel values defines an edge is given by equation (11)

$$R \geq \sqrt{t_1^2 + t_2^2 + t_3^2 + t_4^2 + t_5^2 + t_6^2} \tag{11}$$

where the values $t_1$ through $t_6$ are defined by the equations (12).

$$t_1 = \| x_1 - (x_0 + (1/7)(x_7 - x_0)) \| / \| (x_7 - x_0) \|$$

$$t_2 = \| x_2 - (x_0 + (2/7)(x_7 - x_0)) \| / \| (x_7 - x_0) \|$$

$$t_3 = \| x_3 - (x_0 + (3/7)(x_7 - x_0)) \| / \| (x_7 - x_0) \|$$

$$t_4 = \| x_4 - (x_0 + (4/7)(x_7 - x_0)) \| / \| (x_7 - x_0) \|$$

$$t_5 = \| x_5 - (x_0 + (6/7)(x_7 - x_0)) \| / \| (x_7 - x_0) \|$$

$$t_6 = \| x_6 - (x_0 + (6/7)(x_7 - x_0)) \| / \| (x_7 - x_0) \| \tag{12}$$

the height, H, of the eight-pixel window is defined by equation (13)

$$H = \sqrt{(y_7 - y_0)^2 + (u_7 - u_0)^2 + (v_7 - v_0)^2} \tag{13}$$

Exemplary circuitry suitable for use as the edge finder is shown in FIGS. 2a and 2b. For simplicity, only the circuitry for the two-pixel window and four-pixel windows is shown. One of ordinary skill in the art of designing image processing circuitry could readily extend the circuitry shown for the four-pixel window to produce circuitry suitable for defining edges within an eight-pixel window.

FIG. 2a includes three identical circuits for developing pixel differences for the luminance samples, Y, and the two color difference samples, U and V. For the sake of simplicity only the circuitry for developing the luminance difference samples is shown in detail.

The central feature of the circuitry shown in FIG. 2a is a delay line which includes delay elements 202 and 216. Each of these elements delays the samples provided at its output port by exactly one line interval from the samples applied to its input port. Delay elements 204 and 214, also included in the delay line, provide sample delays of one line minus 2 pixels. The remaining delay elements 206, 208, 210 and 212 each provides a 1 pixel delay. In the circuitry shown in FIG. 2a, the pixel which is having its edges determined, identified below as the target pixel value, is the one stored in delay element 208.

Pixel difference values which are used to define the edges in the two-pixel window are developed by the subtracters 218, 220, 222 and 224. Subtracter 218 develops the difference between the pixel value provided by delay element 202 and that provided by delay element 208. Subtracter 224 develops the difference between the pixel value provided by delay element 208 and that provided delay element 214. The value 2_UP_Y provided by the subtracter 218 represents the difference between the target pixel value and a pixel value occurring exactly one line above the target pixel value in the input image. Similarly, the value 2_DN_Y provided by the subtracter 224 represents the difference between the pixel value and a pixel value occurring one line interval below the target pixel value. Subtracters 220 and 222 generate respective values 2_RTY and 2_LTY which represent, respectively, the differences between the pixel value provided by delay element 208 and that provided by delay elements 206 and 210. Subtracter 226 produces a signal 4_DTU_Y which represents the edge height of the four-pixel window centered at the upper link of the target pixel value. Similarly, subtracter 228 develops a value 4_TDD_Y representing the four-pixel edge height for the down link of the target pixel.

Summing units 230 and 232 generate values 4_T1U_Y and 4_T2U_Y which represent the $t_1$ and $t_2$ values for the upper link of the target pixel value as defined by equations (4). Summing units 234 and 236, in the same way, develop the $t_1$ value (4_T1D_Y) and $t_2$ (4_T2D_Y) values for the down link of the target pixel value.

It is apparent to one of ordinary skill in the art that the subtracter 238 and summing units 242 and 244 produce the edge height for the right link of the target pixel value (4_TDR_Y), and the $t_1$ and $t_2$ values for the right link (4_T1R_Y and 4_T2R_Y). In the same way the subtracter 240 and the summing units 246 and 248 produce the edge height, and $t_1$ and $t_2$ values for the left link of the target pixel value. These are respectively 4_TDL_Y, 4_T1L_Y and 4_T2L_Y. The circuits 250 and 252 shown in FIG. 2a operate on the respective U and V color different signals to generate the corresponding pixel difference values for the up, down, left and right links of the U and V color difference components of the target pixel value.

The circuitry shown in FIG. 2b processes each parameter (t1, t2 and td) of all three image components (Y, U and V) in each of the four directions (up, down, right and left) using 16 root-mean-square (RMS) circuits 254 through 284. The RMS values of the three edge parameters, $t_1$, $t_2$ and $t_d$ (edge height), provided for each of the four-pixel window edges are processed by respectively different four-point decision logic circuits, 286 through 292 to determine whether an edge is defined for the target pixel in respective four-pixel windows surrounding the pixel on the left, right, up, and down, directions.

If an edge is defined, in accordance with equation (6), the decision logic circuit passes the value applied to its $t_d$ input port as the edge height of the edge determined by the four-pixel window. If the decision logic circuit determines that no edge is defined, then it provides an output value of zero as the four-pixel edge height.

The edge values produced for the four pixel windows, as determined by the decision logic circuits 286 through 292, and the edge values for the respective two pixel windows, as provided by the RMS circuits 278 through 284 are applied to respective comparators 294, 296, 298 and 295. These comparators select the greater of the two edge values applied to their respective input ports and pass these values to the MAX/MIN SELECTION circuit 299. The circuit 299 then selects the minimum of these maximum values to provide as the edgeness value for the pixel.

If the circuitry 299 were replaced by maximum circuitry, then the value provided would be the largest edgeness value for the pixel.

Figures 3A, 3B:
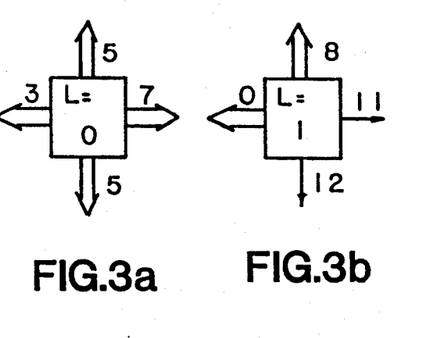
FIGS. 3a, 3b, 3c and 3d are diagrams of individual pixels showing details of how labels are assigned to the pixels by the edge finder shown in FIGS. 2a and 2b.

The assignment of the link-bits is illustrated in FIGS. 3a through 3d. This assignment is also performed by the MIN/MAX SELECTION circuit 299. In the exemplary embodiment of the invention, pixels are classified into two groups: interior pixels and edge pixels. This classification is made by the circuitry 299 based on an edge threshold value. If all of the links of a pixel are less than this threshold value, then all four link bits for the corresponding pixel are set to logic-1 and the pixel is assigned an edge-strength value of zero. This is illustrated in FIG. 3a. In this example, the threshold value is ten.

Since all of the links in the pixel shown in FIG. 3a are less than 10, the edge-strength for the pixel is set to zero even though the smallest link value is three. This marks the pixel as an interior pixel. As shown in FIG. 3b, if a pixel has any edge strength values greater than the threshold it is marked as an edge pixel. An edge pixel is one which has at least one zero-valued link-bit. In FIG. 3b, the pixel has two edges greater than the threshold and two edges less than the threshold. In this instance, the link bits of the pixel are set to indicate which two edges are less than the threshold and the edge strength value of the pixel is set to one plus its smallest link value. For this pixel, since the smallest link value is zero, the minimum edge strength is set to one.

Figure 3C:
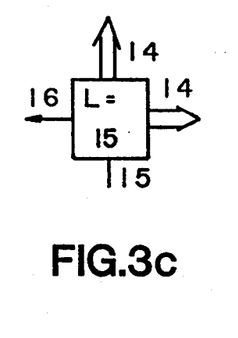

FIG. 3c illustrates the circumstance when an image pixel does not have any link values which are less than the threshold. In the exemplary embodiment of the invention, the link bit or link bits corresponding to the smallest link value (14) are set, even though this value is greater than the threshold value of ten. This smallest link value is also used to set the edge-strength value for the pixel. This value is set to one plus the smallest link value or 15.

Figure 3D:
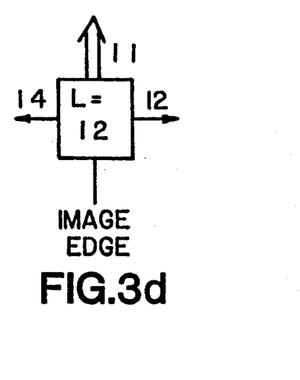

FIG. 3d shows how a pixel at the edge of the image is handled. In this instance, the image edge is treated as having an infinite value. The link to the image edge cannot be the edge-strength value for the pixel nor can its link-bit be set. The link bit for the smallest link, namely 11 is set and the edge strength is set to one plus the smallest link value or 12.

Figure 4:
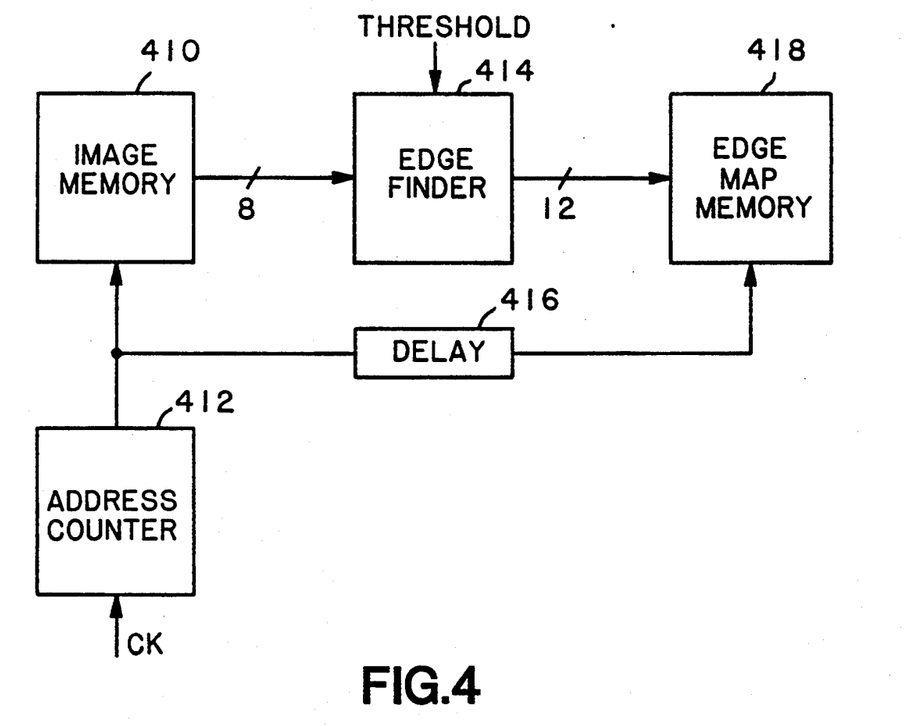
FIG. 4 (is a block diagram of image processing circuitry which includes an edge finder as shown in FIGS. 2a and 2b.

FIG. 4 is a block diagram of an image processing system which uses an edge finder in accordance with the present invention. In this system, an image is stored in an image memory 410 and is provided by the memory 410 in response to successive pixel address values provided by an address counter 412. The image pixels are provided by the memory 410 in raster-scan order. In the exemplary embodiment of the invention, each image pixel is a 24-bit value, comprising three eight-bit bytes representing a luminance component, Y, and two color difference components, U and V. This 24-bit signal is applied to the edge finder 414. The edge finder 414 processes the pixel values, as described above with reference to FIGS. 2a and 2b to produce pixel-based edge information for the image held in the memory 410.

The address values provided by the counter 412 are delayed via a compensating delay element 416 to match the pixel-based edge information provided by the edge finder 414. Responsive to these delayed address values, the edge information provided by the edge finder 414 is stored into the edge map memory 418.

While the invention has been described in terms of exemplary embodiments, it is contemplated that it may be practiced as outlined above within the spirit and scope of the appended claims.

What is claimed:

1. Apparatus for processing a matrix of picture element (pixel) data values representing an image, to define edges within the image comprising:

means for defining a potential edge location in a predetermined direction between first and second ones of the pixel data values which first and second pixel data values are adjacent in the matrix of pixel data values;

means for determining a first edge strength value in the predetermined direction said first edge strength value being a measure of a difference in magnitude between the first and second pixel data values;

means for determining a second edge strength value in the predetermined direction said second edge strength value being a measure of a difference in magnitude over a group of N successive pixel data values in the predetermined direction where N is an integer greater than 2, the N successive pixel values being defined on the matrix of pixel data and including the first and second pixel data values;

means for analyzing the N pixel data values to determine if the N pixel data values define an edge at the potential edge location and for modifying the second edge strength value to indicate a null edge if it is determined that the N pixel values do not define an edge at the potential edge location;

means for comparing the first edge strength value to the second edge strength value to assign one of the first and second edge strength values to the potential edge location.

2. Apparatus according to claim 1, wherein each pixel data value in the matrix of pixel data values defines four link values to pixel data values in respective directions above, below, to the right of and to the left of the pixel data value in the matrix, the apparatus further comprising:

means for determining a respective edge strength value for each of the four links, representing the four respective directions, for each pixel data value in the matrix; and means for selecting one of the four edge strength values of each one pixel data value in the matrix as an edgeness value for the one pixel data value.

3. Apparatus according to claim 2 further including:
   means for comparing each of the edge strength values of each of the four links for each pixel value in the matrix to a threshold value; and means for associating with each one pixel value in the matrix, an indication of the relative magnitude of each of the edge strength values of the one pixel value and the threshold value.

4. Apparatus for processing a matrix of picture element values representing an image, to locate edges within the image comprising:

first edge evaluation means, responsive to a first set of the pixel values in the matrix for determining a first magnitude value for an edge in a predetermined direction between first and second ones of the pixel values in the first set of pixel values second edge evaluation means, responsive to a second set of the pixel values in the matrix, the second set of pixel values being arranged in the predetermined direction in the matrix, having a greater number of pixel values than the first set of pixel values and including the first set of pixel values, for determining a second magnitude for the edge between the first and second pixel values; and means for comparing the first and second edge magnitudes to assign one of the first and second edge magnitudes as an edge value between the first and second pixel values.

5. Apparatus for processing a matrix of picture element (pixel) data representing an image, to locate edges within the image comprising:

first edge evaluation means, responsive to a first set of pixel values in the matrix for determining a first magnitude value for an edge between first and second pixel values in the first set of pixel values second edge evaluation means, responsive to a second set of pixel values in the matrix, the second set having a greater number of pixel values than the first set and including the first set of pixel values, for determining a second magnitude for the edge between the first and second pixel values wherein the first set of pixel values is composed of the first and second pixel values and the second set of pixel values includes the first and second pixel values and third and fourth pixel values at either end of a line in the matrix defined by the first and second pixel values; and means for comparing the first and second edge magnitudes to assign one of the first and second edge magnitudes as an edge value between the first and second pixel values.

6. Apparatus according to claim 5, wherein the second edge evaluation means includes:

means for processing the second set of pixel values to produce first and second parameters which define a normalized profile of the second set of pixel values;

means for processing the second set of pixel values to produce a third parameter which defines the second magnitude;

edge profile means for processing the first and second parameters to determine if the second set of pixel values defines an edge between the first and second pixel values; and means, coupled to the edge profile means, for providing the third parameter as the second magnitude if the edge profile means determines that the second set of pixel values defines an edge between the first and second pixel values and for providing a null value as the second magnitude otherwise.

7. A method for processing a matrix of picture element (pixel) data values representing an image, to define edges within the image, the method comprising the steps of:

defining a potential edge location in a predetermined direction between first and second ones of the pixel data values which first and second pixel data values are adjacent in the matrix of pixel data values;

determining a first edge strength value in the predetermined direction as being a difference in magnitude between the first and second pixel data values;

determining a second edge strength value in the predetermined direction as being a difference in magnitude over a group of N successive ones of the pixel data values in the predetermined direction where N is an integer greater than 2, the group of N successive pixel values being defined on the matrix of pixel data values and including the first and second pixel data values;

analyzing the N pixel data values to determine if the N pixel data values have a profile consistent with an edge at the potential edge location and for modifying the second edge strength value to indicate a null edge if it is determined that the N pixel values are not consistent with an edge at the potential edge location;

comparing the first edge strength value to the second edge strength value to assign one of the first and second edge strength values to the potential edge location.

* * * * *

UNITED STATES PATENT AND TRADEMARK OFFICE
CERTIFICATE OF CORRECTION

PATENT NO.    : 5,420,971
DATED         : May 30, 1995
INVENTOR(S)   : Peter Westerink et al.

It is certified that error appears in the above-identified patent and that said Letters Patent is hereby corrected as shown below:

Column 4, line 53, equation 3, delete "$t_1=(x_2-x_0)/(x_3-x_0)$" and substitute therfor --$t_2=(x_2-x_0)/(x_3-x_0)$--.

Column 5, line 59, equation 7, delete "$H = |x_3 - X_0|$" and substitute therefor --$H = |x_3 - x_0|$--.

Column 6, line 28, equation 11, after "$R \geq$" delete "$\sqrt{t_2}^2$" and substitute therefor --$\sqrt{t_1}^2$--.

Column 6, line 37, equation 12, delete "(6/7)" and substitute therefor --(5/7)--.

UNITED STATES PATENT AND TRADEMARK OFFICE
CERTIFICATE OF CORRECTION

PATENT NO.   : 5,420,971
DATED        : May 30, 1995
INVENTOR(S)  : Peter Westerink et al.

It is certified that error appears in the above-identified patent and that said Letters Patent is hereby corrected as shown below:

Column 9, line 67, claim 4, before "values" insert --(pixel)--.

Signed and Sealed this

Seventeenth Day of October, 1995

*Attest:*

*Attesting Officer*

BRUCE LEHMAN

*Commissioner of Patents and Trademarks*